United States Patent [19]
Mori

[11] Patent Number: 5,188,476
[45] Date of Patent: Feb. 23, 1993

[54] BALL JOINT

[75] Inventor: Izuru Mori, Aichi, Japan

[73] Assignee: TRW Steering & Industrial Products (Japan) Co., Ltd., Tokyo, Japan

[21] Appl. No.: 867,136

[22] Filed: Apr. 10, 1992

[30] Foreign Application Priority Data

Apr. 12, 1991 [JP] Japan .................................. 3-80241

[51] Int. Cl.$^5$ ............................................ F16C 11/00
[52] U.S. Cl. ................................... 403/133; 403/135; 403/132
[58] Field of Search ............... 403/133, 137, 140, 135, 403/132; 384/297

[56] References Cited

U.S. PATENT DOCUMENTS 3,554,586  1/1971  Cutler .................................... 403/140
3,909,084  9/1975  Snider ................................. 403/135 X
4,353,660  10/1982 Parks .................................. 403/140 X

FOREIGN PATENT DOCUMENTS 203783   6/1959  Austria ................................. 403/135
3823755  1/1989  Fed. Rep. of Germany ...... 403/132

Primary Examiner—Andrew V. Kundrat
Attorney, Agent, or Firm—Tarolli, Sundheim & Covell

[57] ABSTRACT

A ball joint comprises a socket having a wall defining a socket hole, and a ball stud having a ball portion at one end thereof. The ball portion is received within the socket hole for pivotal movement by means of a bearing intervening between the ball and the wall of the socket. The bearing is provided with a plurality of protrusions formed in the outer circumferential surface thereof, the circumferential surface being in contact with the surface of the wall of the socket. The protrusions having a band or dot-shaped configuration.

3 Claims, 3 Drawing Sheets

BALL JOINT

BACKGROUND OF THE INVENTION

1. Field of the Invention

The present invention generally relates to a ball joint, and more particularly to a ball joint which exhibits excellent performance, accommodating variations in dimension of individual components constituting such a ball joint or variations in load applied thereto during assembly thereof.

2. Description of the Prior Art

A ball joint for use in a steering linkage, suspension or the like of an automobile includes in general a socket and ball stud. The ball stud includes a ball portion received in a socket hole of the socket for pivotal movement therein by means of a bearing intervening between the ball and the socket.

Such a bearing is formed from a synthetic resin material having a high wear resistance, representing low resiliency. An outer configuration of the bearing is designed to be identical to an inner configuration of the socket hole so as to permit the bearing to be received within the socket hole without any significant clearance therebetween. Accordingly, the bearing may produce a significant amount of variation in repulsive, resilient force, even if dimensional error of components constituting the ball joint is small.

Accordingly, and if dimensional accuracy of each component is decreased, a bearing, when assembled, will present significantly fluctuated repulsive, resilient force and thus constant operational torque of the ball stud could not be obtained. When the bearing is significantly worn, a substantial amount of clearance will be produced between the ball portion of the stud and the bearing, so that appropriate operational torque of the ball stud could not be maintained, thus adversely affecting performance of the joint.

Japanese Utility Model Public Disclosure No. 64-39922 and Japanese Utility Model Publication No. 63-17855, for example, disclose ball joints in an effort to eliminate the above problems experienced in the prior art.

The ball joint disclosed in Japanese Utility Model Public Disclosure No. 64-39922 includes a bearing formed in the outer surface thereof with protrusions and recesses adjacent thereto. When the bearing is installed in a socket hole, the above protrusions are urged against the wall defining the socket hole and are displaced into the recesses, so as to reduce variation in resilient, repulsive forces of the bearing. This ball joint, however, does not provide sufficient resilient, repulsive force due to the large amount of deformation of the protrusions. Further, it appears that durability of such a ball joint would be insufficient, since resilient, repulsive force will be decreased due to "creep" phenomenon of the protrusions. Furthermore, such a ball joint would cause significant variations in resilient, repulsive forces depending upon variation in deformation of the protrusions.

A ball joint disclosed in Japanese Utility Model Publication No. 63-17855 includes a socket hole having recesses in its wall at an inclined surface between cylindrical surface and bottom surface. Thus, this ball joint is designed to permit the ball stud to generate a stable operational torque, owing to the inclined surface of the bearing positioned above the depressions which generate a bending repulsive force. This joint however requires complicated manufacturing process in order to form recesses in the inclined surface of the socket hole. It takes a great deal of time to form the depressions by machining. When it is intended to form such depressions in a molding die during molding process, the life of the molding die will be shortened, since such die should have edge portions. In any case, forming the depressions in the inclined surface of the socket hole would increase manufacturing costs significantly.

SUMMARY OF THE INVENTION

Accordingly, it is an object of the invention to provide a ball joint which provides reliable performance regardless of dimensional errors present in components of the joint, while enabling low cost manufacture.

The above object is achieved in the present invention by providing a ball joint which comprises a socket having a wall defining a socket hole, and a ball stud having a ball portion at one end thereof. The ball portion is received within the socket hole for pivotal movement by means of a bearing intervening between the ball and the wall defining the socket hole. The bearing is provided with a plurality of protrusions formed in the outer circumferential surface thereof, the circumferential surface being in contact with the surface of the wall defining the socket. The protrusions have a band shape or dot-shaped configuration.

OPERATION

According to the ball joint of the invention, the protrusions formed in the outer circumferential surface of the bearing are deformed during installation of the bearing into the socket hole. Thus, variation in dimension of the components due to dimensional tolerance and/or variation in assembling load can be accommodated.

Further, increased resilient, repulsive forces will be generated by the deformation of the protrusions, since the protrusions have a band shape or dot-shaped configuration. Thus, an appropriate amount of operational torque can be applied to the ball stud.

Furthermore, the bearing provides reduced abrasion or wear and increased durability. The bearing of the ball joint of the invention can be manufactured by means of a resin mold substantially identical to that used for manufacture of a conventional bearing.

BRIEF DESCRIPTION OF THE DRAWINGS

The invention will now be described in detail with reference to the attached drawings in which.

DESCRIPTION OF PREFERRED EMBODIMENT

Figure 1:
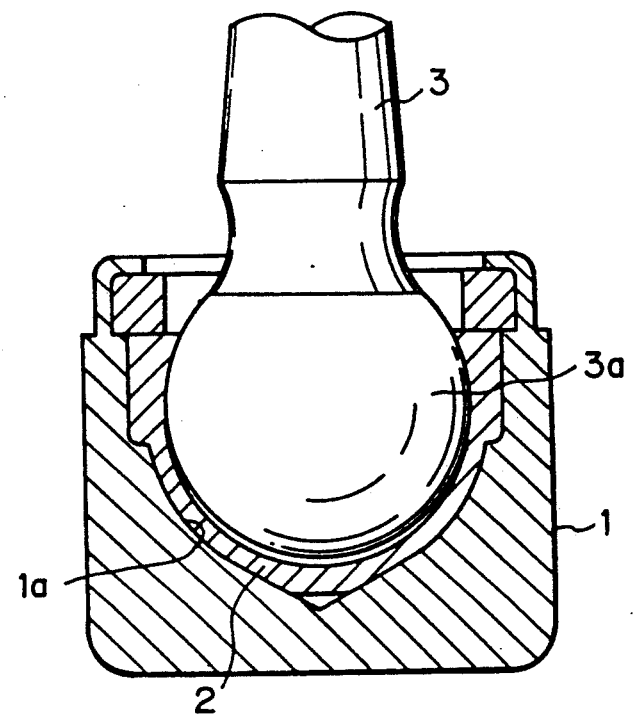
FIG. 1 is a longitudinal sectional view of a ball joint according to one embodiment of the invention.

A ball joint of the invention includes, as shown in FIG. 1, a socket 1 having a socket hole 1a formed therein and a ball stud 3 having a ball portion 3a at one end thereof. The ball portion 3a is received in the socket hole 3a for pivotal movement by means of a bearing 2 interposed between the ball portion 3a and the wall of the socket hole 1a.

Figure 2:
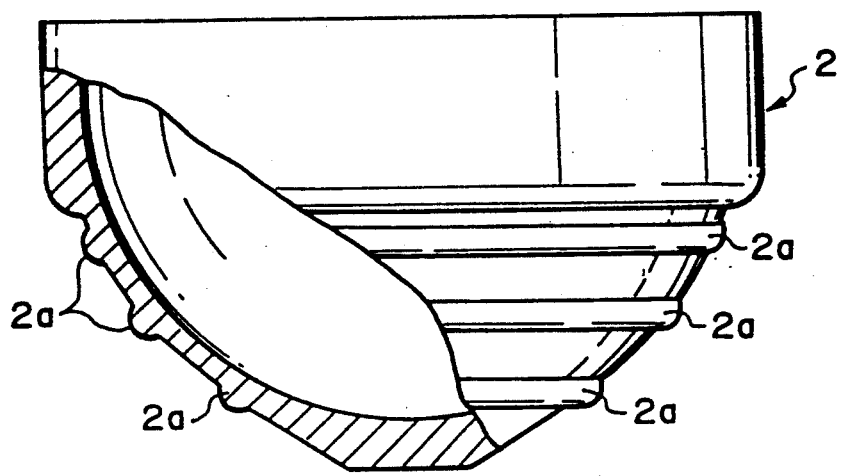
FIG. 2 is an enlarged side elevational view of a bearing shown in FIG. 1.
Figure 3:
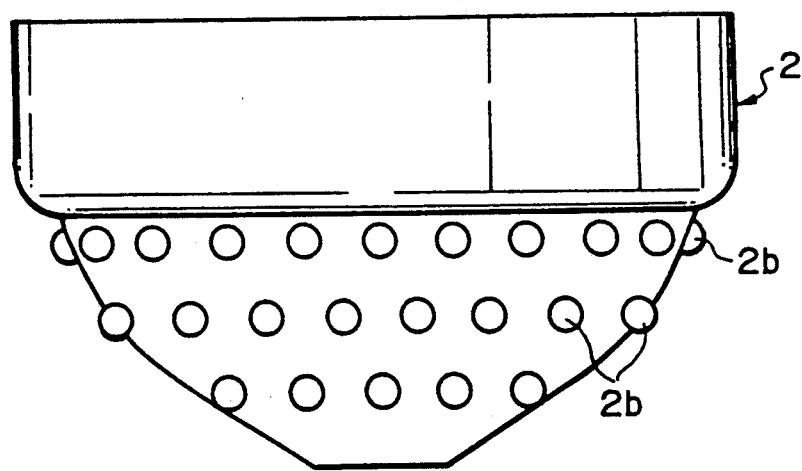
FIG. 3 is an enlarged side elevational view of a bearing according to another embodiment of the invention.

The bearing 2 is formed from a wear resistant synthetic resin material into a substantially semi-sphere configuration. As shown in FIG. 2, the bearing 2 is formed in the outer circumferential surface thereof, excepting the upper and lower parts of the surface, with a plurality of band shaped protrusions 2a of a semi-circular cross-section. The protrusions extend circumferentially along the central axis of the bearing in parallel with and spaced apart from one another. It should be noted that, instead of the band or ring-shaped protrusions shown in FIG. 2, a plurality of dot-shaped protrusions 2b could be provided in the outer circumferential surface of the bearing 2, excepting the upper and lower part thereof, as shown in FIG. 3.

The protrusions 2a and 2b are urged against the wall surface defining the socket hole 1a to be deformed under assembling load exerted during installation of the bearing 2 into the socket hole 1a. The protrusions 2a and 2b are further deformed by means of a load exerted from the ball portion 3a when the ball stud 3 is being used. Accordingly, it is necessary for the protrusions 2a and 2b to have a sufficiently large area engaged with the wall surface of the socket hole 1a in order to withstand the above two loads. Furthermore, the height of the protrusions 2a and 2b should be selected such that, when the protrusions are further deformed from a state shown in FIG. 5 in which they are deformed under the assembling load to a state shown in FIG. 6 in which they are deformed under the load exerted from the ball portion 3a, the amount of deformation will be within an elastic deformation range.

Figure 4:
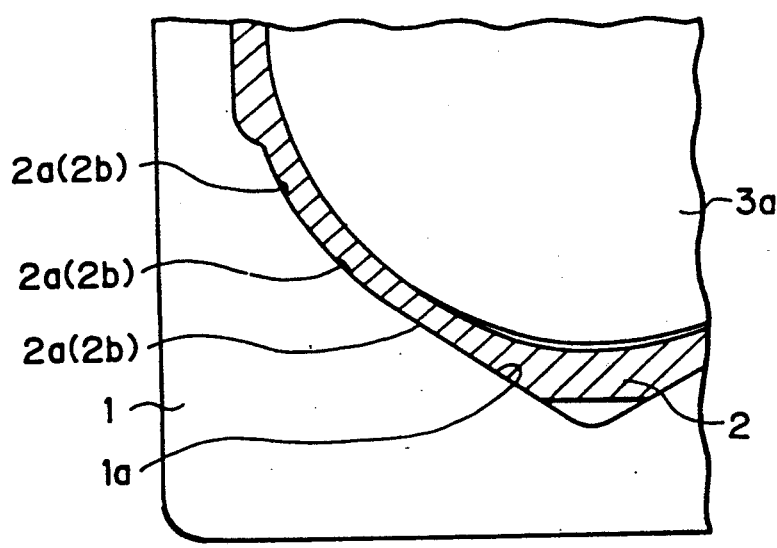
FIG. 4 is an enlarged part cross-sectional view of the bearing shown in FIG. 2 or FIG. 3, illustrating protrusions of the bearing deformed when urged against the inner surface of a socket hole.
Figure 5:
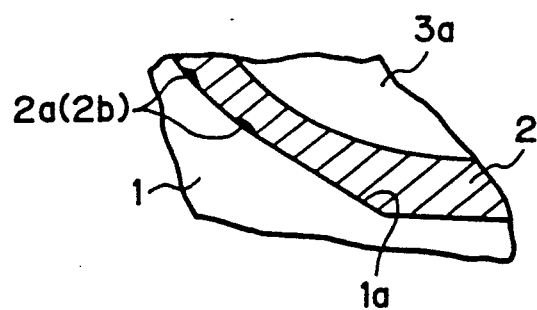
FIG. 5 is an enlarged part cross-sectional view similar to FIG. 4.
Figure 6:
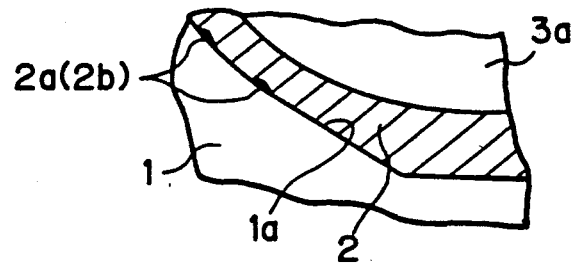
FIG. 6 is an enlarged part cross-sectional view similar to FIG. 4.

As will be appreciated from the foregoing, and in accordance with a ball joint of the embodiment, an assembling load larger than a load exerted by the ball stud 3 during operation of the ball joint is applied to the bearing upon installation of the bearing into the socket hole 1a. Under the assembling load, the protrusions 2a and 2b are urged against the wall surface of the socket hole 1a to be deformed, as shown in FIGS. 4 and 5. The resultant large amount of resilient force will be applied to the socket 1 and ball portion 3a. Accordingly, a suitable amount of actuation torque can be applied to the ball stud 3.

As will be understood from the above, variations in dimensions of the sockets, bearings or the like constituting a ball joint, which may occur due to dimensional tolerance, and/or variations in assembly load, for example, which may occur during installation of the bearing into the socket hole, can be accommodated by a resilient force exerted by the protrusions 2a or 2b. That is, such variations can be accommodated by means of elastic deformation of the protrusions 2a or 2b. Thus, variation in operational torque of the ball stud 3 is minimized, as well as providing stable performance of the ball joint.

In operation, the ball portion 3a exerts a load against the bearing 3. This load is accommodated by the protrusions 2a or 2b as they deform resiliently. Accordingly, friction between the ball portion 3a and bearing 2 is minimized, and thus, there would be no possibility for a clearance between the ball portion 3a and the bearing to become wider. Thus, the bearing permits appropriate operational torque of the ball stud 3 to be maintained. This serves to prolong durability of the ball joint.

The protrusions 2a or 2b can be formed by a resin mold. Such a resin mold has mold life and cycle time the same as those of a resin mold for forming conventional bearings. This restricts any increase in cost of manufacture.

The band-shaped protrusions 2a have been shown to have a semi-circular cross-section. They may, however, have another cross-sectional shape, such as a trapezoid or rectangle.

As described above, a ball joint according to the invention provides a stable and reliable function, regardless of possible dimensional errors present in components thereof, as well as enabling lower manufacture cost.

What is claimed is:

1. A ball joint comprising:
   a socket and a ball stud which are pivotable relative to each other;
   said socket having a wall defining a chamber, said chamber having a central axis;
   said ball stud including a shank portion and a ball portion located at one end of said shank portion, said ball portion being received within said chamber for pivotal movement therein; and
   a bearing located between said wall of said socket and said ball portion of said ball stud, said bearing having a central axis parallel to said central axis of said chamber, said bearing having an outer circumferential surface facing said wall of said socket;
   said bearing including protrusions on said outer circumferential surface, said protrusions being spaced along the central axis of said bearing, each protrusion contacting said wall of said socket and deforming when a load is applied urging the protrusion against said wall of said socket.

2. A ball joint according to claim 1 wherein each of said protrusions consists of a single continuous endless band extending around said central axis of said bearing.

3. A ball joint according to claim 1 wherein each of said protrusions consists of a plurality of dots, said dots being spaced apart around said central axis of said bearing and being located in parallel rows.

* * * * *